(12) United States Patent  (10) Patent No.: US 8,130,328 B2
Vermeulen  (45) Date of Patent: Mar. 6, 2012

(54) MOUNTED ROTATABLE TELEVISION UNIT

(76) Inventor: Timothy John Vermeulen, Thornhill (CA)

( * ) Notice: Subject to any disclaimer, the term of this patent is extended or adjusted under 35 U.S.C. 154(b) by 1622 days.

(21) Appl. No.: 11/492,206

(22) Filed: Jul. 25, 2006

(65) Prior Publication Data

US 2007/0052872 A1  Mar. 8, 2007

Related U.S. Application Data

(60) Provisional application No. 60/701,939, filed on Jul. 25, 2005.

(51) Int. Cl.
H04N 5/645 (2006.01)
F16M 13/00 (2006.01)
(52) U.S. Cl. ........................................ 348/825; 248/425
(58) Field of Classification Search .................. 348/825; 248/425
See application file for complete search history.

(56) References Cited

U.S. PATENT DOCUMENTS

| 3,936,026 A | 2/1976 | Hampel |
| 6,095,476 A * | 8/2000 | Mathis ........................... 248/422 |
| 2003/0133037 A1 | 7/2003 | Lee |
| 2003/0164431 A1 | 9/2003 | Kanashiki |

FOREIGN PATENT DOCUMENTS

| DE | 202004012298 | 4/2004 |
| JP | 55159680 | 12/1980 |
| WO | WO 2006 059843 | 6/2006 |

* cited by examiner

Primary Examiner — Jay Patel
Assistant Examiner — Richard Torrente
(74) Attorney, Agent, or Firm — Hill & Schumacher

(57) ABSTRACT

The present invention is a mounted rotatable television unit for installing a television in one of a wall and a cabinet wherein when installed therein the television is rotatable at least 180 degrees. The unit has an inner frame and an outer frame. The inner frame is adapted to receive a television. The outer frame is adapted to be installed in one of the wall and the cabinet and is rotatably attached to the inner frame whereby the inner frame may be pivoted such that the television is rotatable at least 180 degrees.

27 Claims, 16 Drawing Sheets

MOUNTED ROTATABLE TELEVISION UNIT

CROSS REFERENCE TO RELATED PATENT APPLICATION

This patent application relates to U.S. Provisional Patent Application Ser. No. 60/701,939 filed on Jul. 25, 2005 entitled WALL MOUNTED SWIVEL TELEVISION UNIT which is incorporated herein by reference in its entirety.

FIELD OF THE INVENTION

This invention relates to television units and in particular television units that are mounted in a wall and can be viewed from either side of the wall.

BACKGROUND OF THE INVENTION

Televisions seem almost ubiquitous; it seems that they are found in virtually all homes in North America. Further in some homes televisions are found in every room. While homes in some areas are getting smaller, televisions are getting larger. Accordingly the situation of the television in a home is both a space and a design issue.

A number of devices have been suggested by which a television is attached to a wall, ceiling or table. Specifically there are a number of patents directed to devices for supporting a television from the ceiling. U.S. Pat. No. 5,400,993 issued to Hamilton on Mar. 28, 1995 shows a device for suspending a television and a VCR from the ceiling or from a wall. The television is held by an inner support member which is tiltable relative to an outer support member. However, the device is not mountable in a wall and the inner and outer support members are not rotatable by 180°. U.S. Pat. No. 4,993,676 issued to Fifts et al. on Feb. 19, 1991 shows an apparatus for supporting a television form a ceiling. There is provided an L-shaped member which is positioned over a ceiling joist and an elongate shaft is attached thereto. A cabinet for the television is attached to the shaft. U.S. Pat. No. 4,566,663 issued to Barchus on Jan. 28, 1986 shows a ceiling mounted television stand. The ceiling mount includes a first bracket and a second bracket with a ball and socket joint therebetween. The ball and socket joint moves relative to each other to preselected positions. A bolt is positioned between the ball and socket. A nut with a handle attached thereto is used to clamp the ball and socket into the preselected positions. The television is bolted to the television stand. U.S. Pat. No. 5,102,081 issued to Barchus et al. is similar to the the Barchus '663 patent but the television is held in place with a pair of extension brackets and flexible straps. The extension brackets are adjustable to accommodate different sized televisions. U.S. Pat. No. 4,237,476 issued to Appledom on Dec. 2, 1980 discloses a device wherein the television can be viewed directly or used to project the image to a remote screen. The device is provided with an odd number of mirrors so that in the projection mode the television is repositioned to project onto the mirrors such that the image is reversed.

In addition, there are a number of devices directed to a pivotable base for a television. Specifically, U.S. Pat. No. 6,095,476 issued to Mathis on Aug. 1, 2000 is directed to an adjustable television stand which allows the television to be raised or lowered or tilted. However, the device does not provide for the television to be rotated. U.S. Pat. No. 3,462,112 issued to Vom Brack et al. on Aug. 19, 1969 is an early patent directed to a connector assembly which allows the display tube of the television to be pivoted relative to the base. Somewhat similarly U.S. Pat. No. 3,936,026 issued to Hampel et al. on Feb. 3, 1976 provides for a swivel base assembly which allows for 270° of movement of the electronic device relative to the base. Neither of these devices disclose a device that is mounted in the wall and that allows for viewing from either side of the wall by moving the device 180°.

There are also some devices for mounting a television in a wall. Specifically, U.S. Pat. No. 2,672,506 issued to Schulz on Mar. 16, 1954 is an early patent which discloses a device for mounting a television in a wall. A somewhat similar patent is the U.S. Pat. No. 5,293,244 issued to Kawaguchi on Mar. 8, 1994 which is directed to a rear projection type television that is mounted in a wall. Neither of these patents, however, disclose a device which allows for the television screen to be moved once the unit is installed.

Accordingly it would be advantageous to provide a device such that one television could be viewed from the rooms on either side of a particular wall. Further it would be advantageous if such a device is attractive from either side of the wall.

SUMMARY OF THE INVENTION

The present invention is a mounted rotatable television unit for installing a television in one of a wall and a cabinet wherein when installed therein the television is rotatable at least 180 degrees. The unit comprises an inner frame and an outer frame. The inner frame is adapted to receive a television. The outer frame is adapted to be installed in one of the wall and the cabinet and is rotatably attached to the inner frame whereby the inner frame may be pivoted such that the television is rotatable at least 180 degrees.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
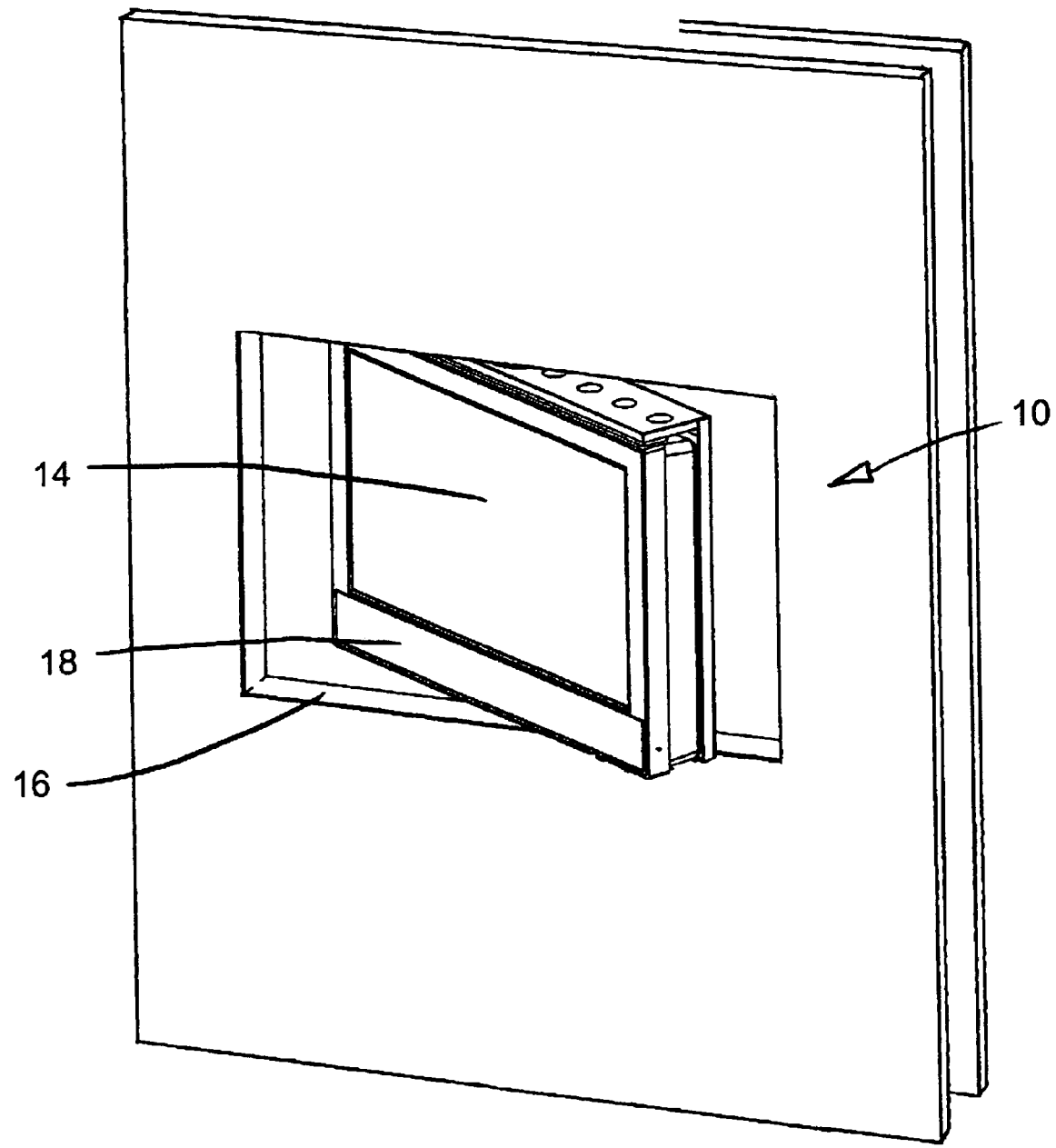
FIG. 1 is a perspective view of the mounted rotatable television unit constructed in accordance with the present invention and mounted in a wall.
Figure 2:
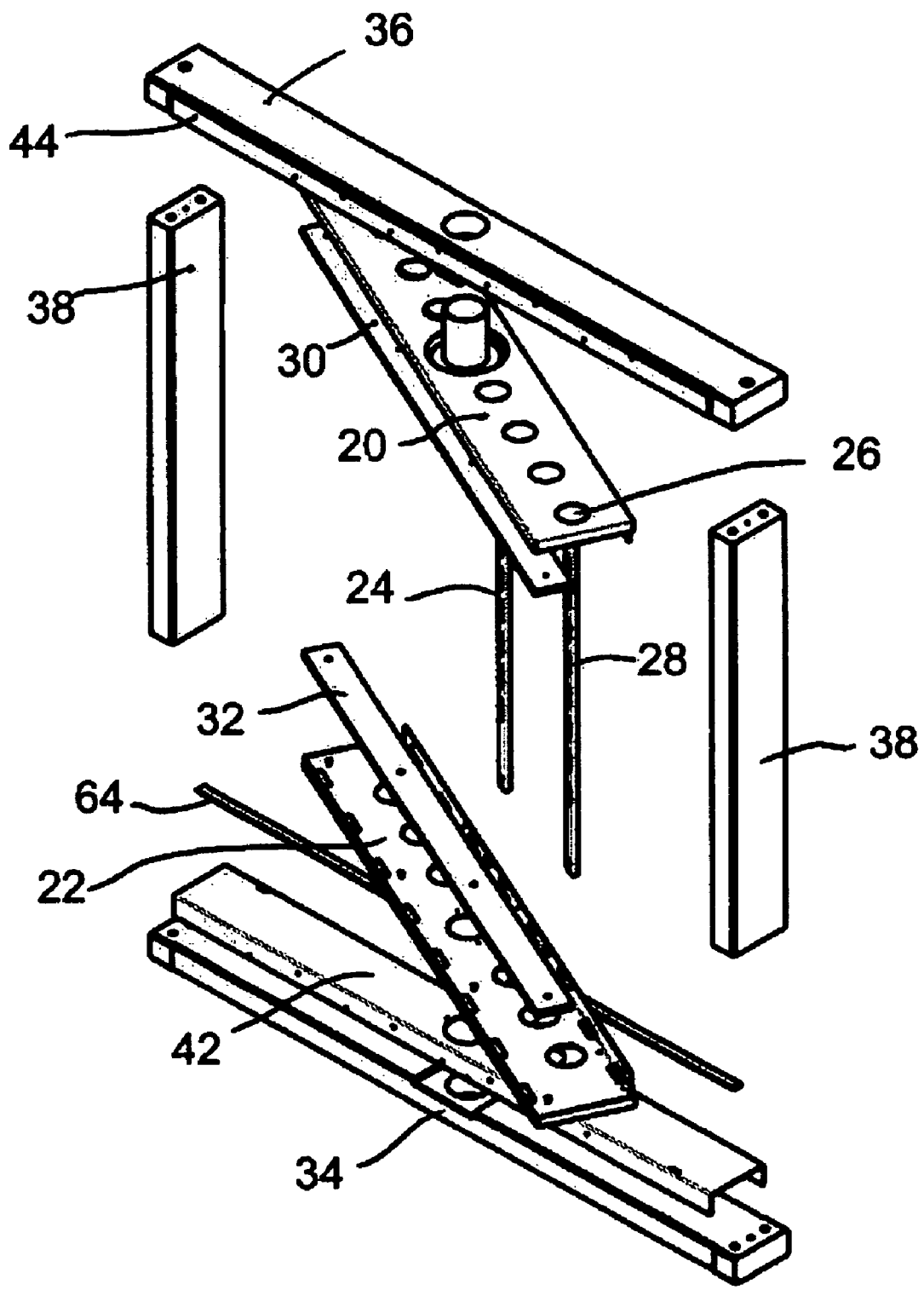
FIG. 2 is a blown apart perspective view of the mounted rotatable television unit.
Figure 3:
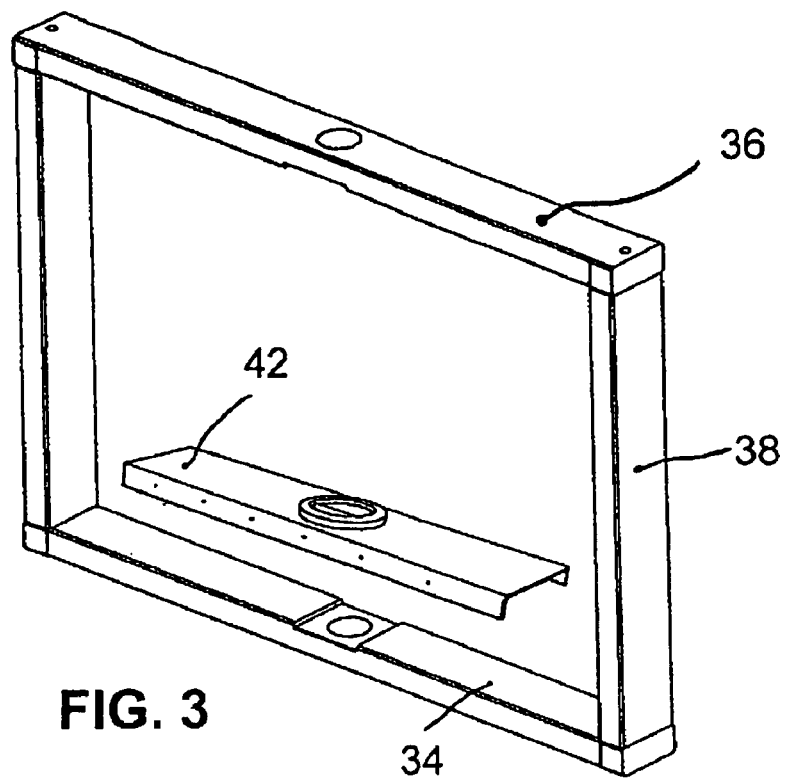
FIG. 3 is a perspective view of the outer frame of the mounted rotatable television unit.
Figure 4:
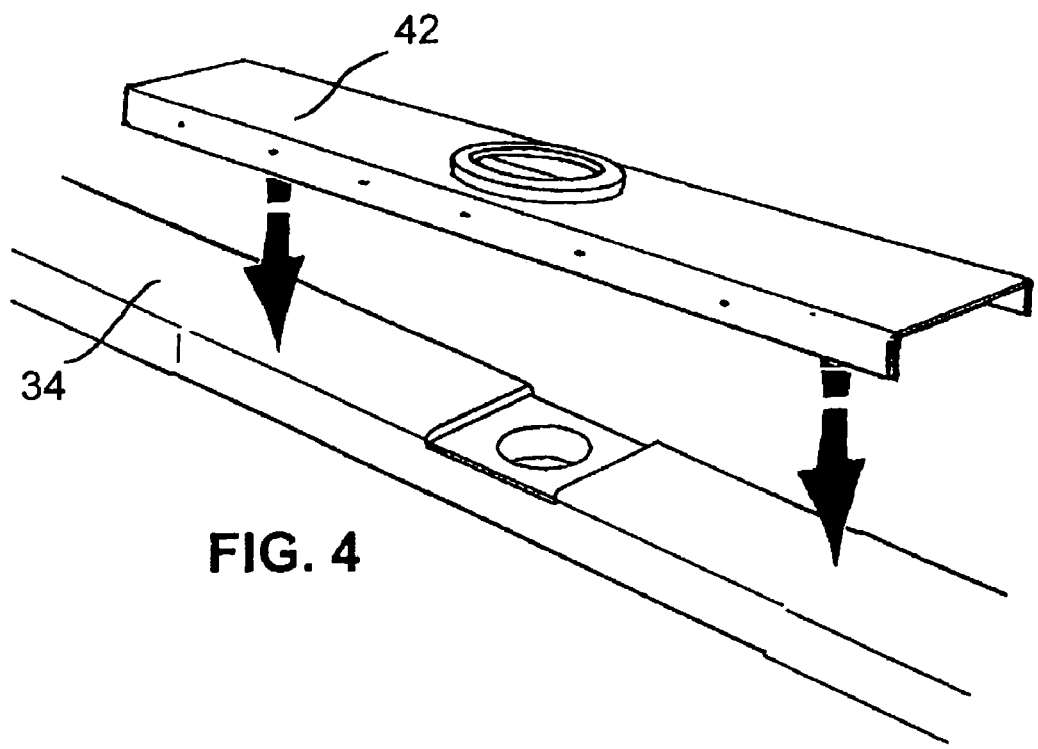
FIG. 4 is an enlarged perspective view of a portion of the outer frame and the base plate.

Referring to FIGS. 1 to 9, the mounted rotatable television unit of the present invention is shown generally at 10. Unit 10 is mounted into a wall 12 opening created in an interior wall between two rooms such that the user can watch the television 14 from either room by rotating the television unit 180 degrees. The television would have the same look facing either direction.

The mounted rotatable television unit 10 of the present invention includes an outer frame 16 and an inner frame 18. The inner frame 18 includes a top rotatable bracket 20, a bottom rotatable bracket 22 and a pair of rear mounting brackets 24. The top and bottom rotatable brackets 20, 22 each have a plurality of vent holes 26 formed therein. Rear mounting brackets 24 have a plurality of mounting apertures 28 formed therein. The mounting apertures 28 are positioned to be in registration with the standard mounting holes on a television 14. The spacing between the rear mounting brackets 24 is determined by the spacing of the mounting holes on the television. Optionally a bottom spacer 32 may be used where it is necessary to raise the television sufficiently to allow electrical cables to pass through post 50 in the bottom rotatable bracket 42. A top spacer 30 may be used to match the bottom spacer.

Figure 10:
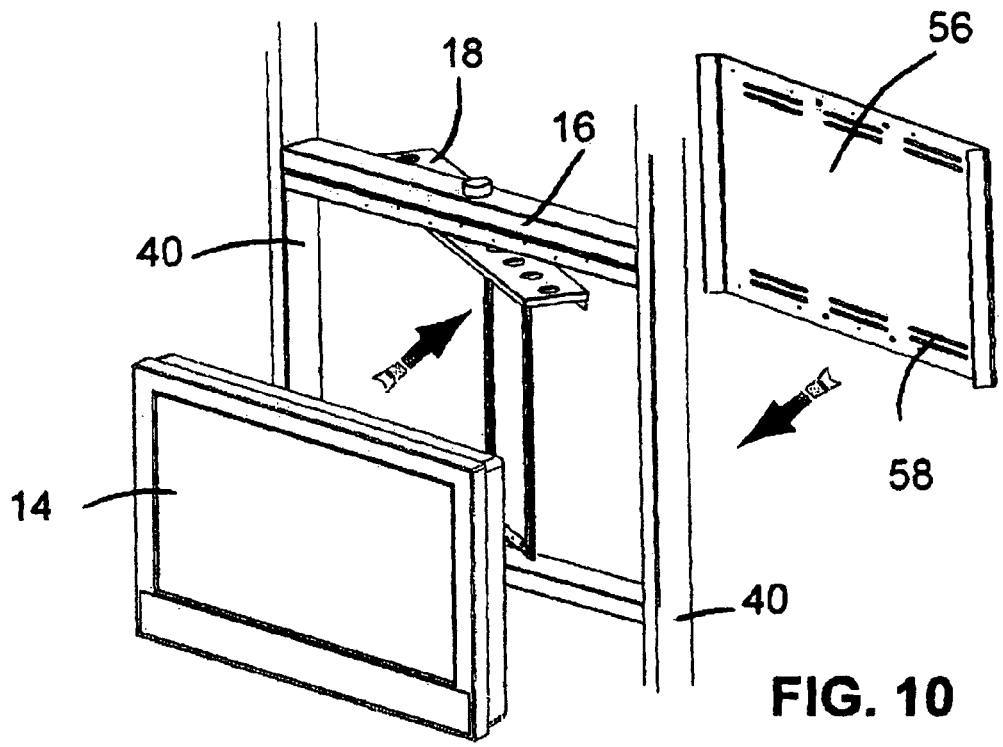
FIG. 10 is a perspective view of the television being positioned in the mounted rotatable television unit and showing the back panel being attached thereto.
Figure 11:
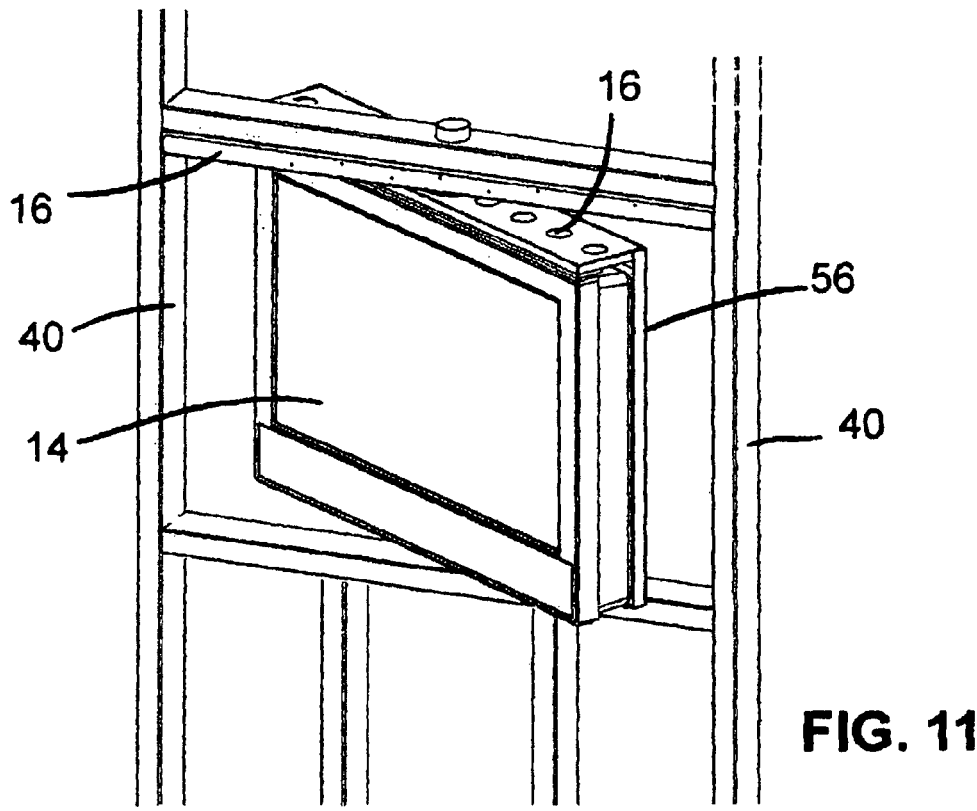
FIG. 11 is a perspective view of the mounted rotatable television unit with a television positioned therein and showing the back panel attached thereto.

The outer frame 16 includes bottom frame member 34, top frame member 36 and side frame members 38. As shown in FIGS. 10 and 11 side frame members may not be needed because the side of the hole aligns with existing wall studs 40. A base plate 42 and a top pate 44 are positioned over the bottom frame member 34 and top frame member 36 respectively.

Figure 5:
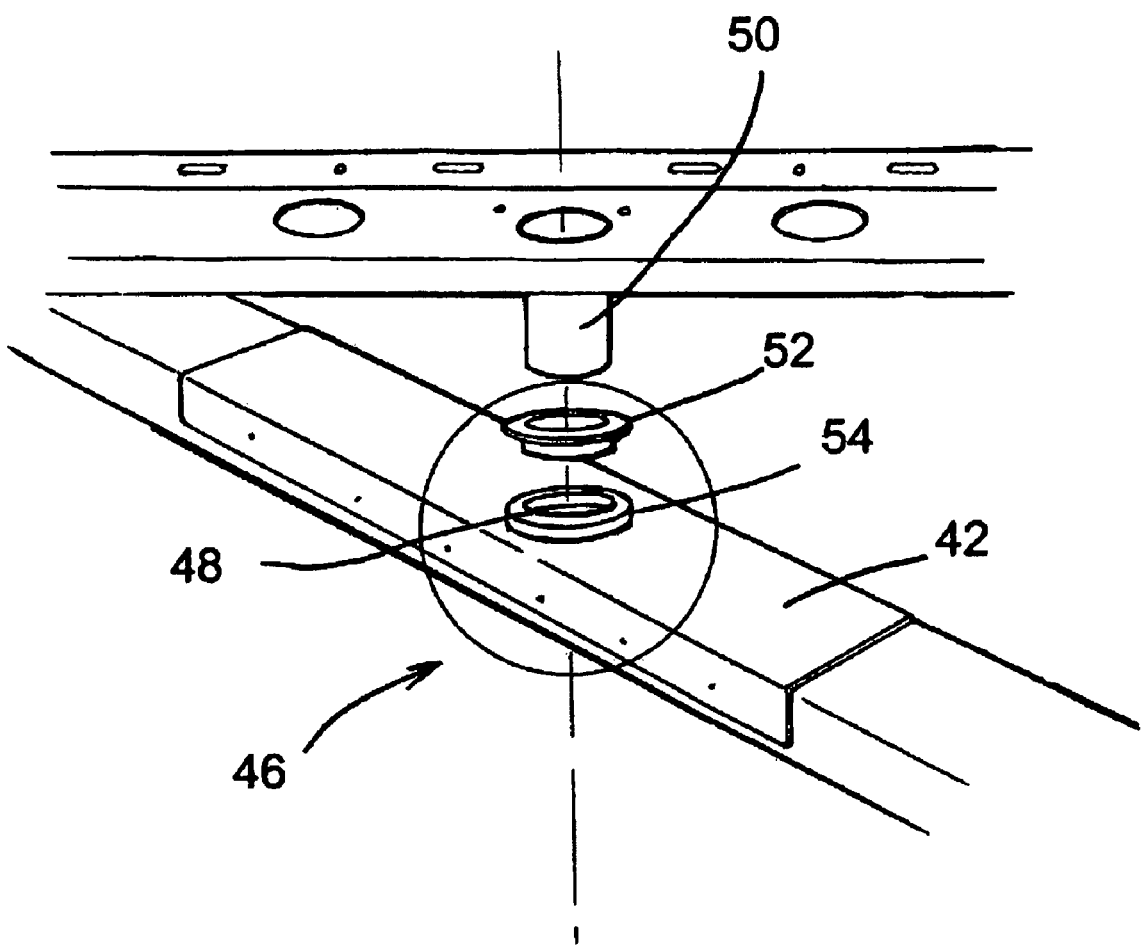
FIG. 5 is an enlarged perspective view of the pivot connection between the inner frame and the outer frame.
Figure 6:
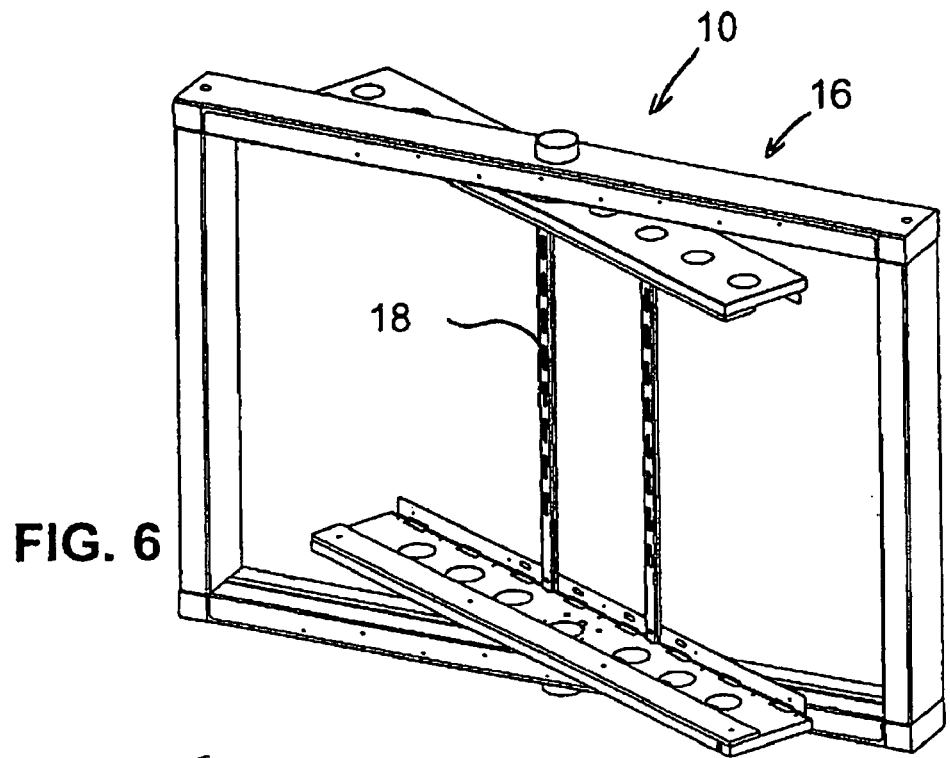
FIG. 6 is a perspective view of the inner frame and the outer frame of the mounted rotatable television unit without the television position therein.
Figure 7:
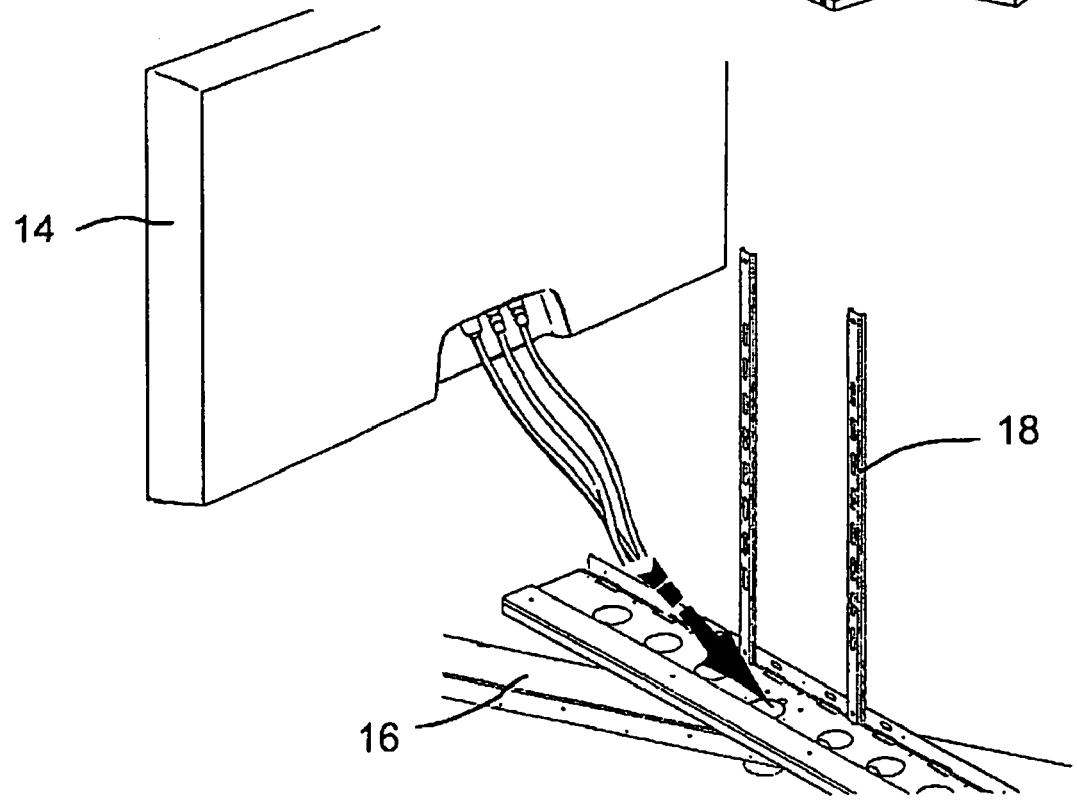
FIG. 7 is a perspective view similar to that shown in FIG. 6 and showing the television being positioned therein.
Figure 8:
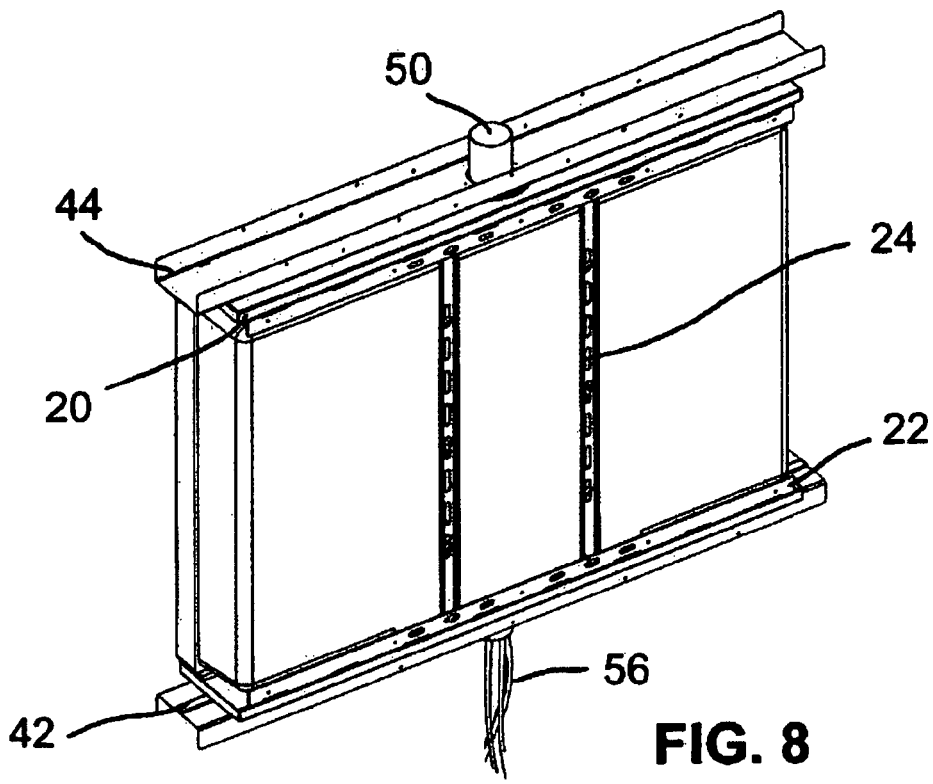
FIG. 8 is a back perspective view of the inner frame and a portion of the outer frame of the mounted rotatable television unit with a television installed therein.
Figure 9:
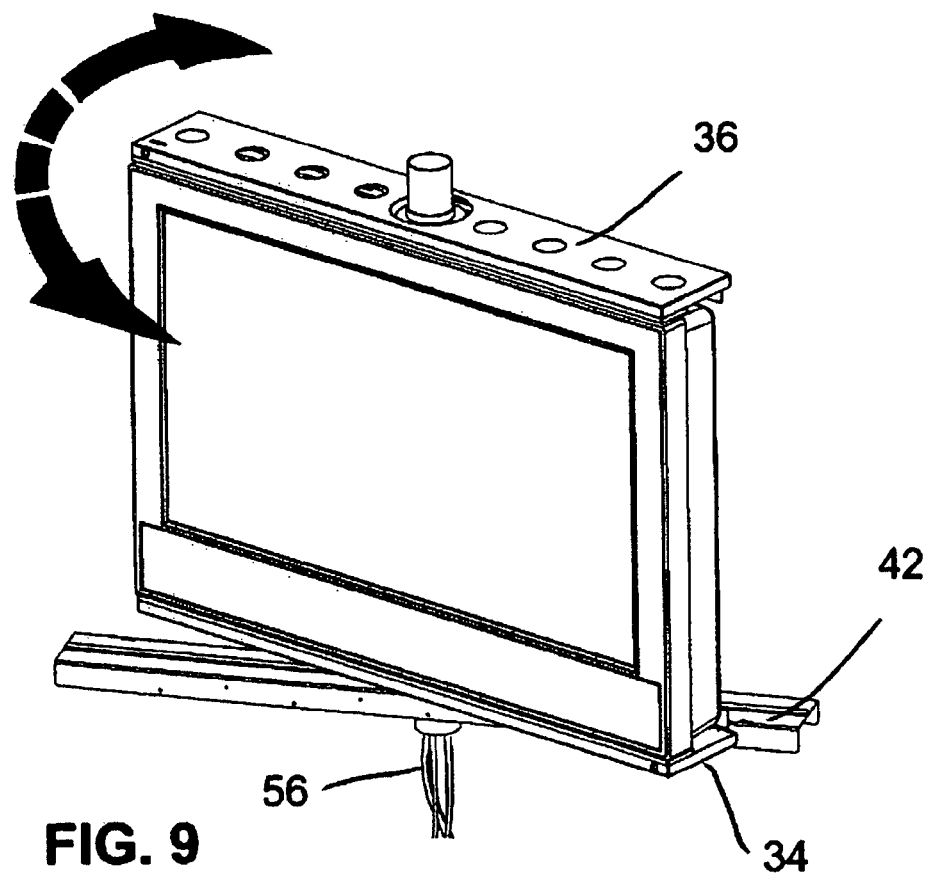
FIG. 9 is a front perspective view of the inner framed and the portion of the outer frame of the mounted rotatable television unit with a television installed therein.

The inner frame 18 is rotatably connected to the outer frame 16 with a pivot 46 best seen in FIG. 5. Pivot 46 includes a generally circular aperture 48 formed in the outer frame, a post 50 extending downwardly from the inner frame and a sleeve 52 positioned therebetween. Sleeve 52 is made from nylon and allows the inner frame 18 to move freely relative to the outer frame 16. Preferably aperture 48 includes an inner frame collar 54 that extends upwardly from the base plate 42 and is attached thereto. Post 50 in the bottom rotatable bracket 42 is a hollow tube such that the electrical wires 56 can be positioned therein is best seen in FIGS. 7, 8 and 9. The wires are then positioned as other electrical wires are positioned in a house for other wired units.

Referring to FIGS. 10 and 11, a removable back panel 56 is attached to the rear side of the inner frame 18 behind the television 14. The purpose of the back panel 56 is to cover the back of the television 14 so that it cannot be seen. The panel 56 could be finished as desired, to coordinate with the room or to coordinate with the inner frame 18. The back panel 56 would be durable and strong enough to resist normal household day to day touching and bumping. Back panel 56 includes vent holes 58.

Figure 12:
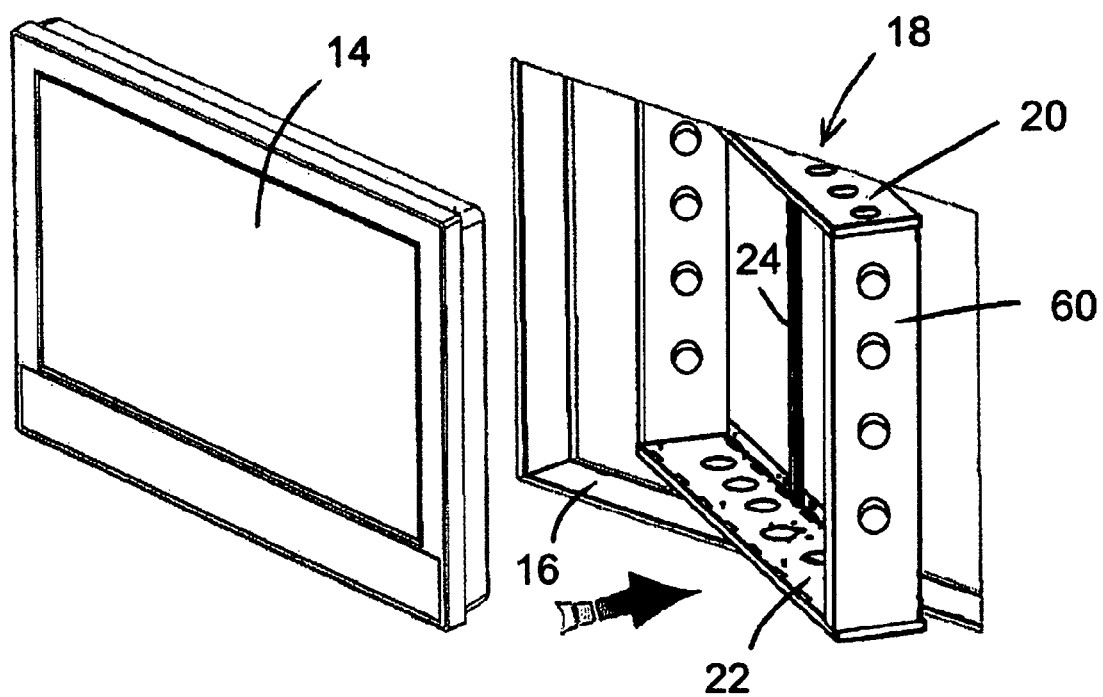
FIG. 12 is a perspective view of an alternate embodiment of the mounted rotatable television unit of the present invention wherein the inner frame also includes side.

It will be appreciated by those skilled in the art that the mounted rotatable television unit of the present invention may be varied in a number of ways and remain within the scope of the invention. A number of variations or additional features are shown in FIGS. 12 through 23. For example the inner frame 18' may also include side brackets 60 as shown in FIG. 12.

Figure 13:
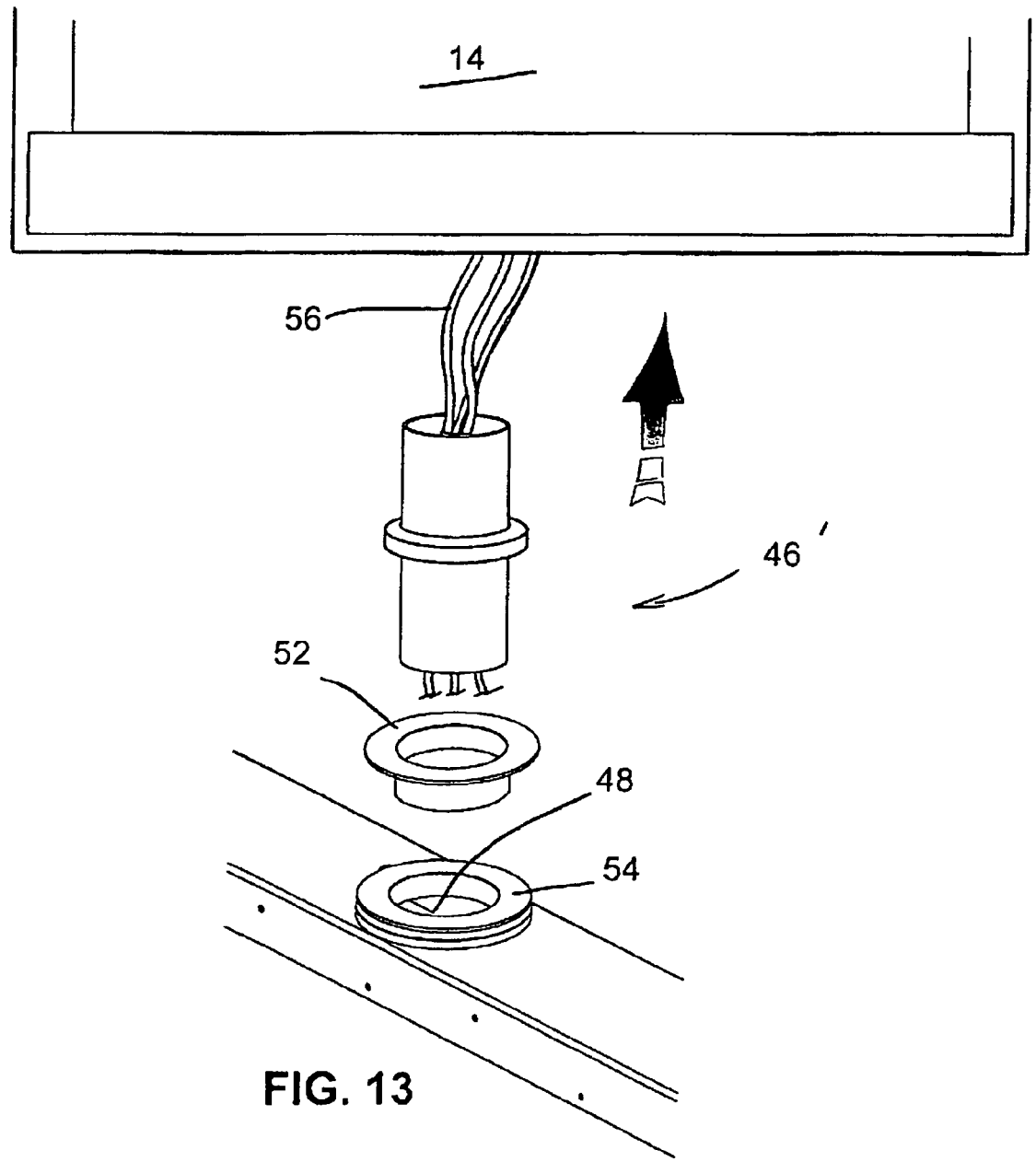
FIG. 13 is a perspective view similar to that show in FIG. 5 but showing a shaft that goes into the television.

Referring to FIG. 13, pivot 46' may include a post 62 that extends upwardly into the television 14. The remainder of pivot 46' is as described above including an aperture 48, a collar 54 and a sleeve 52. Note, this version excludes the rotatable bracket, mounting brackets and back panel.

Figure 14:
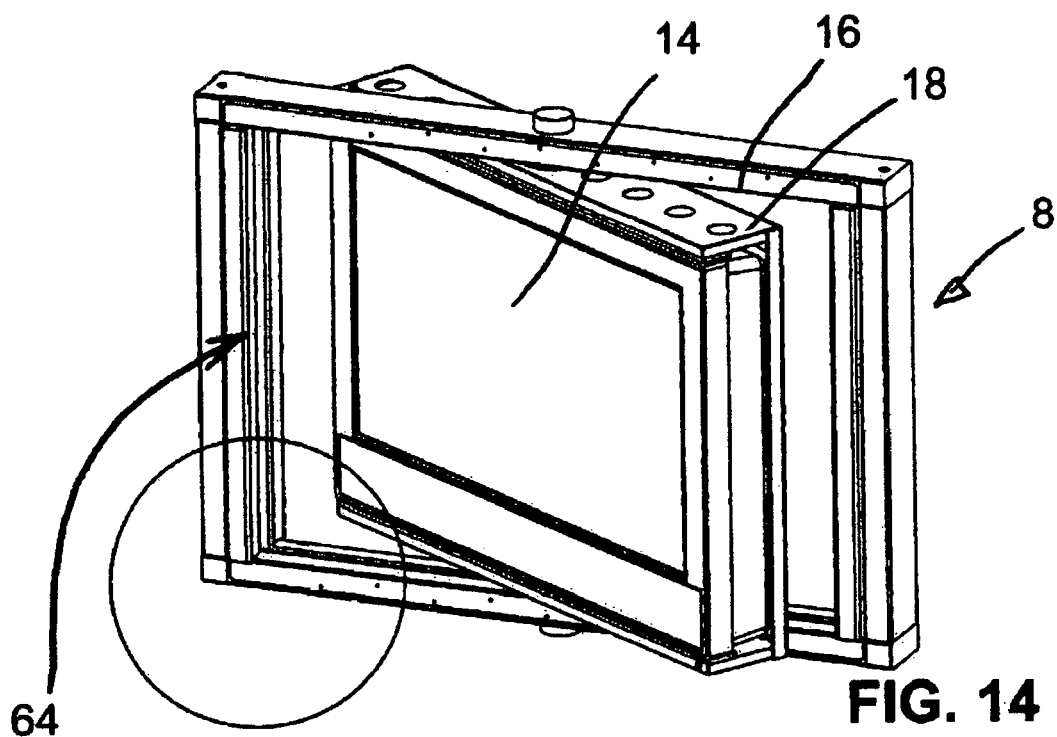
FIG. 14 is a perspective view of the mounted rotatable television unit and showing a privacy strip between the inner frame and the outer frame.
Figure 15:
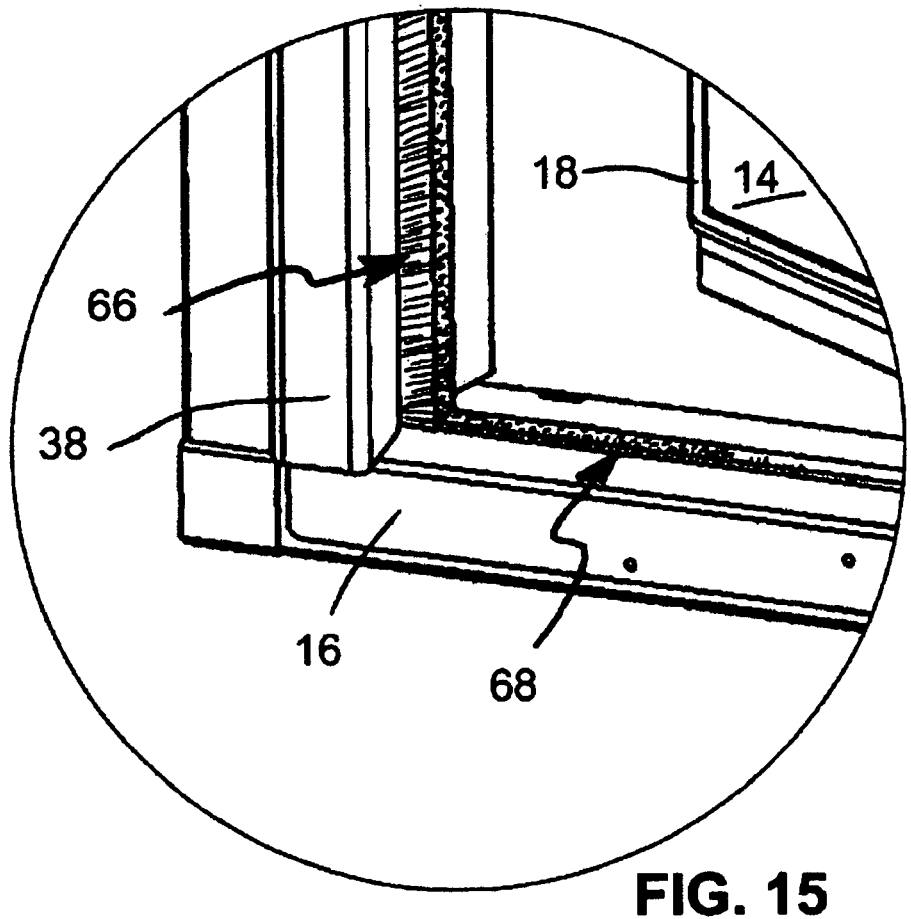
FIG. 15 is an enlarged view of the privacy strip.

Referring to FIGS. 14 and 15, the user may prefer to ensure that one cannot see from one room into the other around the television. In that case privacy strips 64 may be installed between the inner frame 18 and the outer frame 16. The privacy strip is attached to the outer frame side members 38 and has flexible bristle material with long bristles 66. Along the top and bottom, short bristles 68 may be attached to the outer frame 16.

Figure 16:
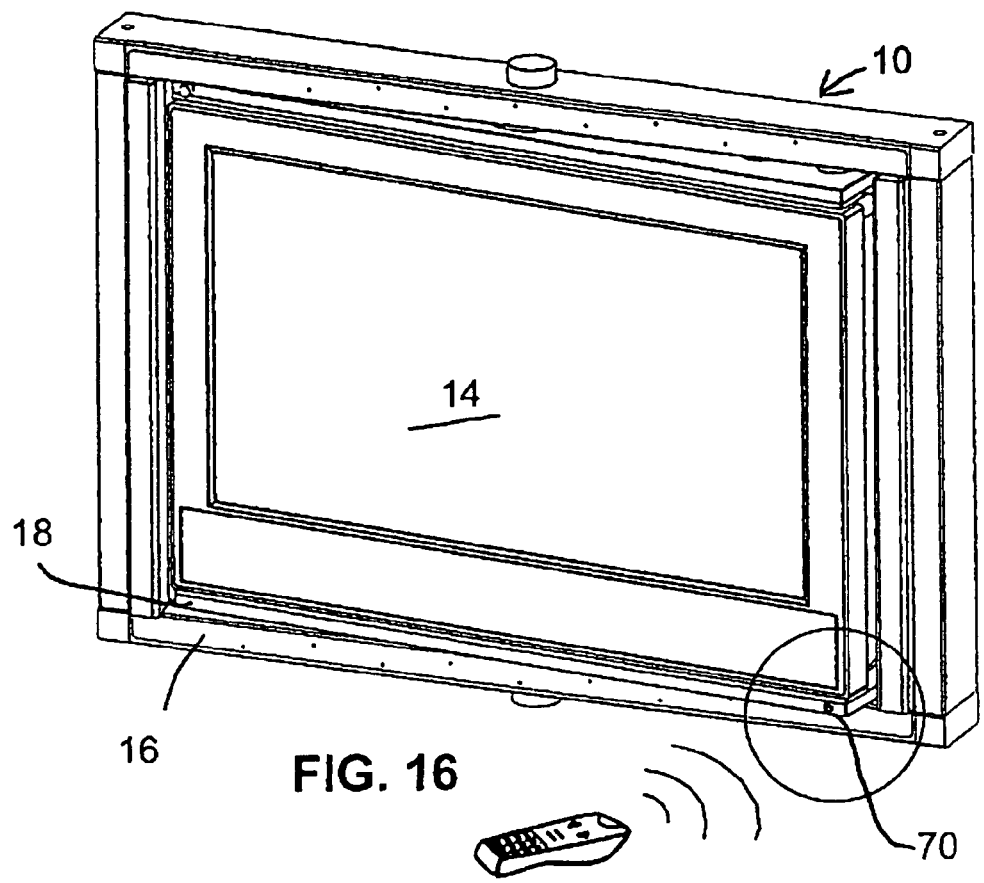
FIG. 16 is a perspective view of the mounted rotatable television unit and showing a remote control sensor.
Figure 17:
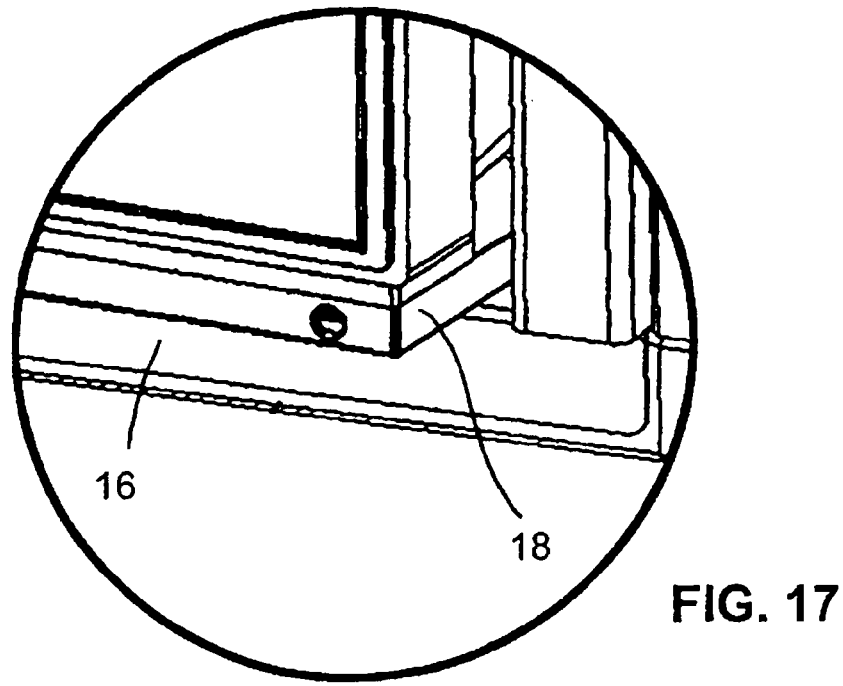
FIG. 17 is an enlarged view of the remote control sensor.

Referring to FIGS. 16 and 17 the unit 10 could also be provided with a remote control sensor 70 which would be attached to the inner frame 18. Contemplating that many televisions are connected to digital cable or satellite boxes, the purpose of the sensor is to receive signals from the remote control in either viewing room and relay them back to the digital cable or satellite box which would reside in one of the rooms. As well the sensor would be operably connected to a VCR and/or DVD and/or other electronic device such as a computer. Another purpose of the sensor would be to receive remote control signals which activate the motorized rotation of the unit.

Figure 19:
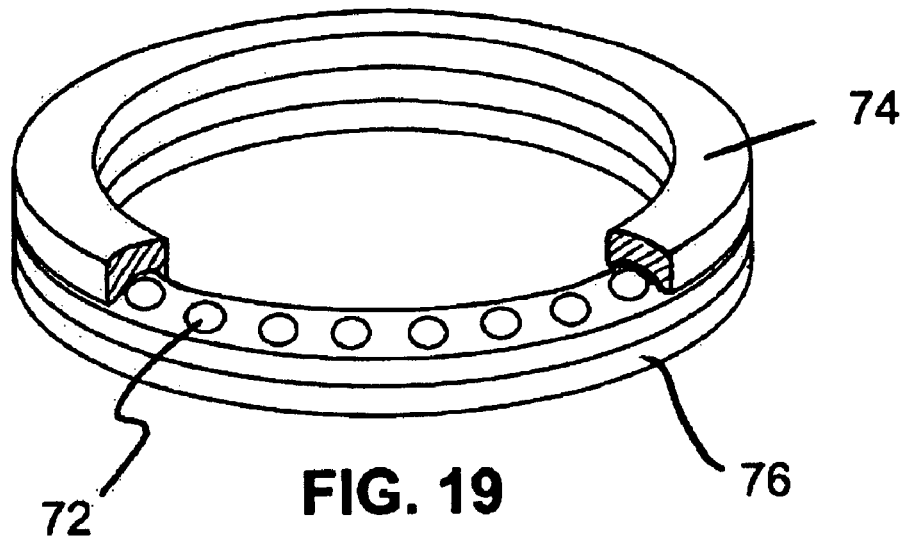
FIG. 19 is an enlarged view of an alternate ball bearing type pivot.

An alternate pivot is shown in FIG. 19 at 72. Pivot 72 is a ball bearing type pivot wherein a first portion 74 would be attached to inner frame 18 and second portion 76 would be attached to outer frame 16.

Figure 18:
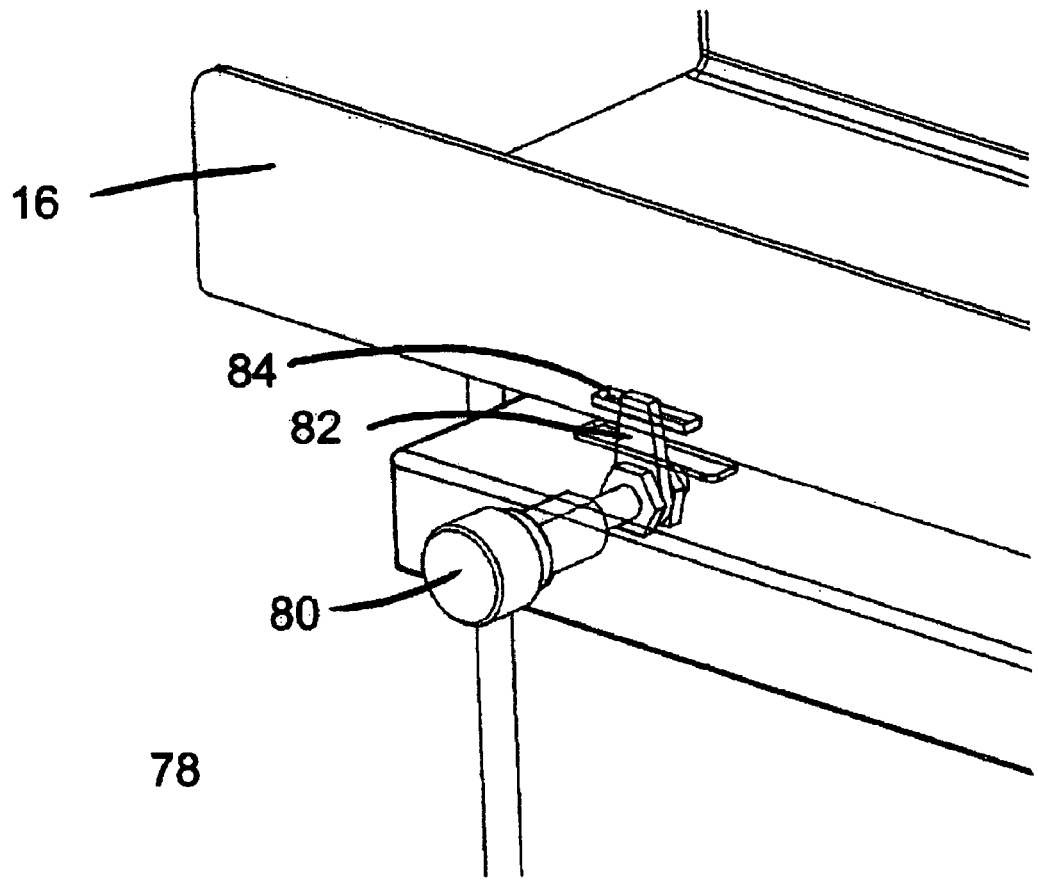
FIG. 18 is an enlarged view of the locking mechanism for use in association with the mounted rotatable television unit of the present invention.

Referring to FIG. 18 it may also be desirable to provide a locking mechanism to hold the unit in a particular position. One example of a locking mechanism is shown at 78. Locking mechanism includes a knob 80 operably attached to a lock arm 82 which engages a slot 84 in outer frame 16.

Figure 20:
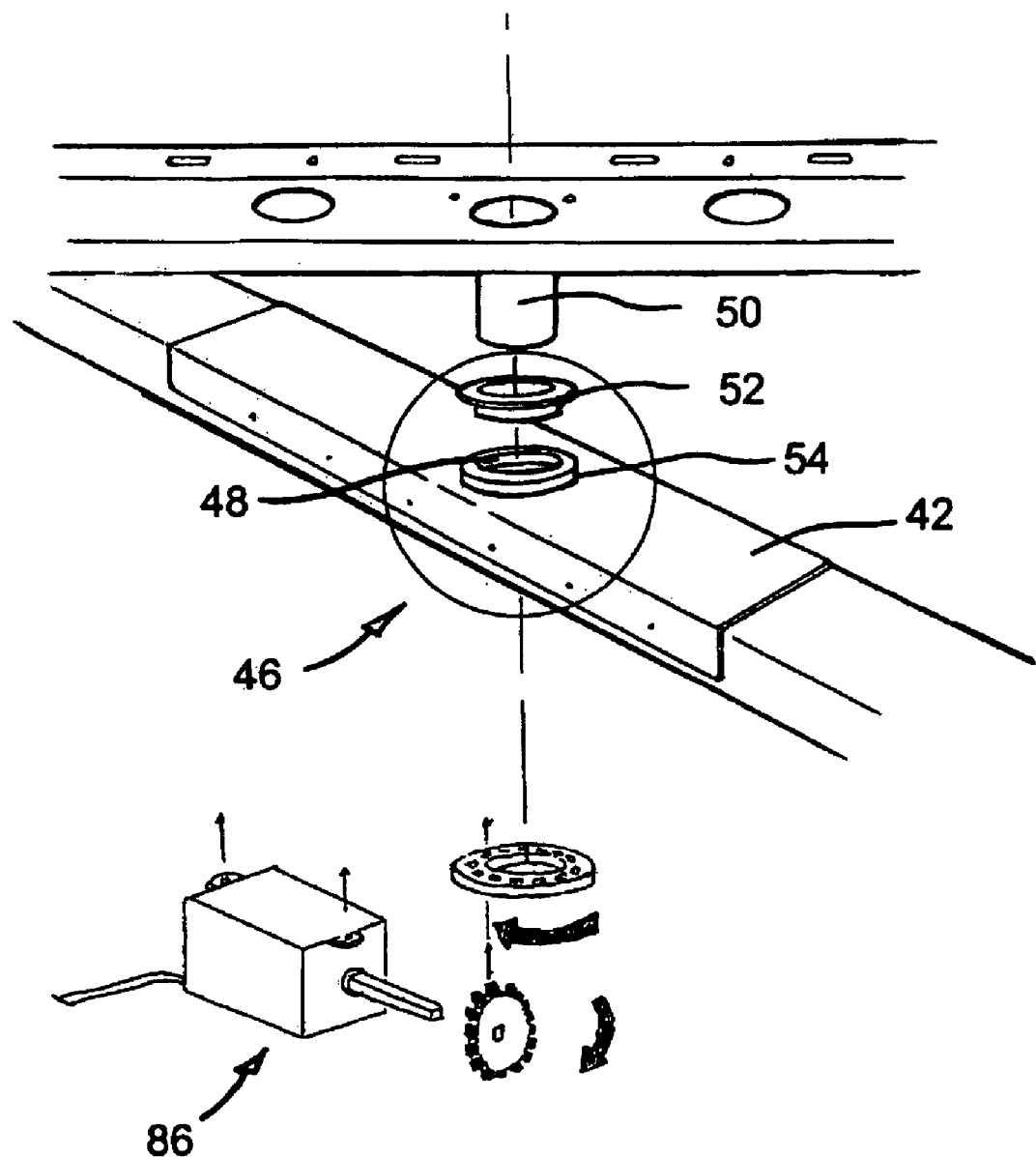
FIG. 20 is an enlarged perspective view similar to that shown in FIG. 5, showing the pivot connection between the inner frame and the outer frame and showing a motor for rotating the unit.

Referring to FIG. 20, a motor 86 may be attached to pivot 46 so that by activating the motor 86 the post 50 is rotated.

Figure 21:
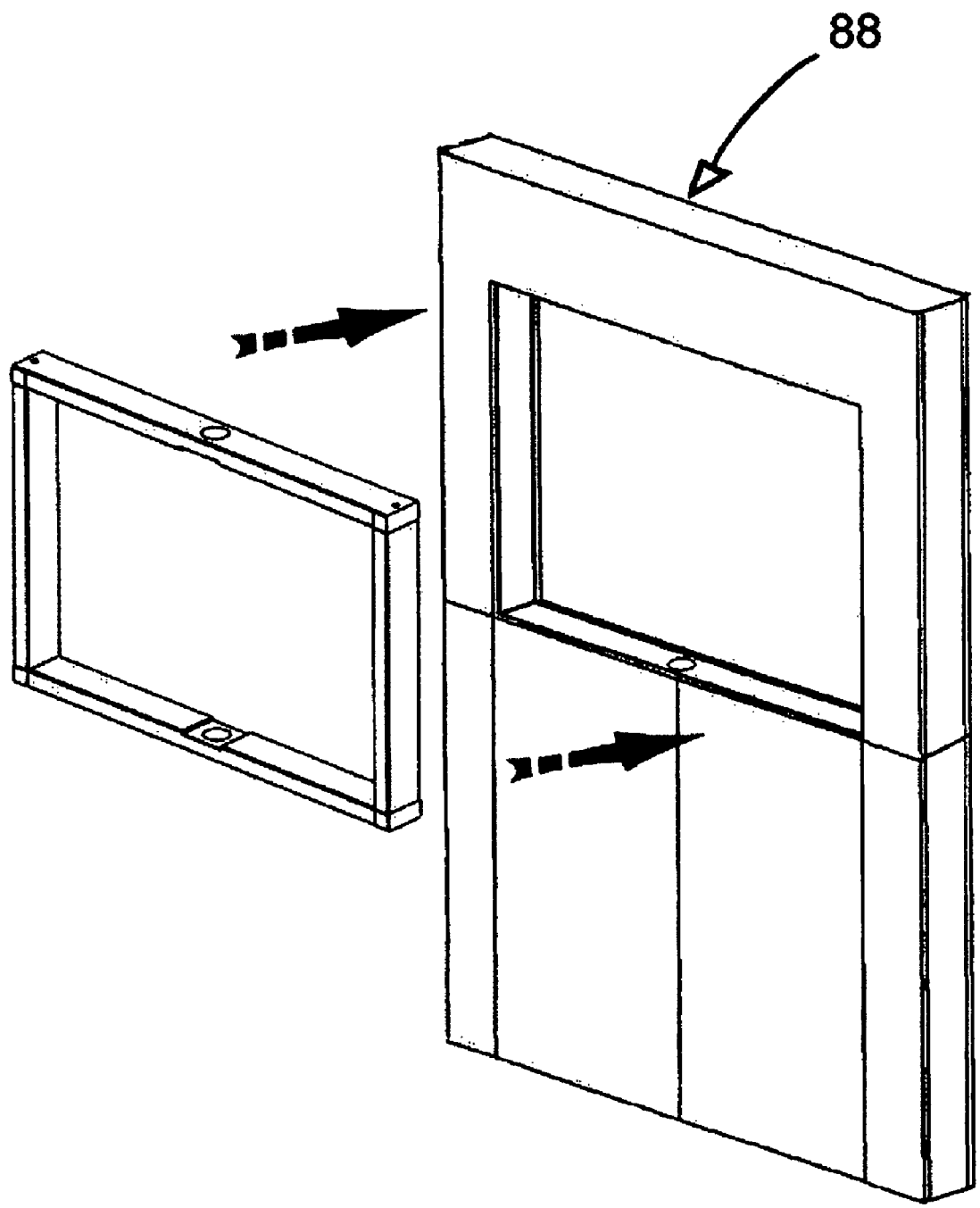
FIG. 21 is a perspective view of the mounted rotatable television unit of the present invention mounted in a wall unit.
Figure 22:
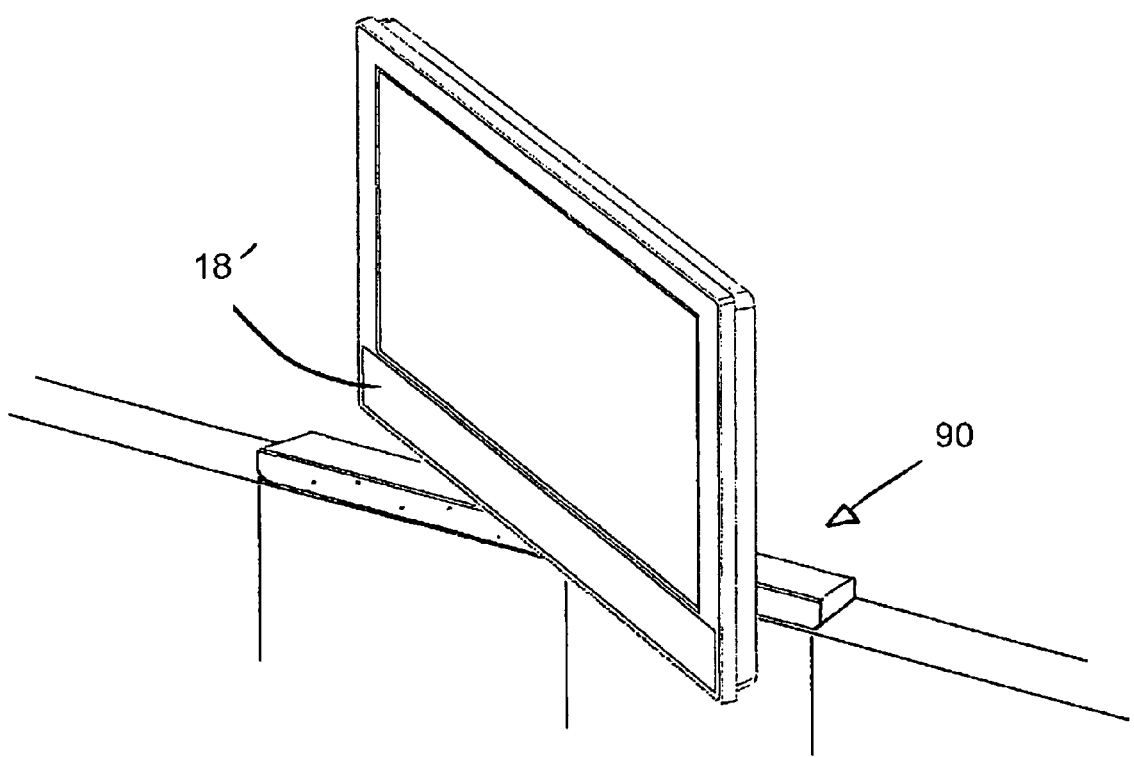
FIG. 22 is a perspective view of the mounted rotatable television unit of the present invention mounted on a cabinet.
Figure 23:
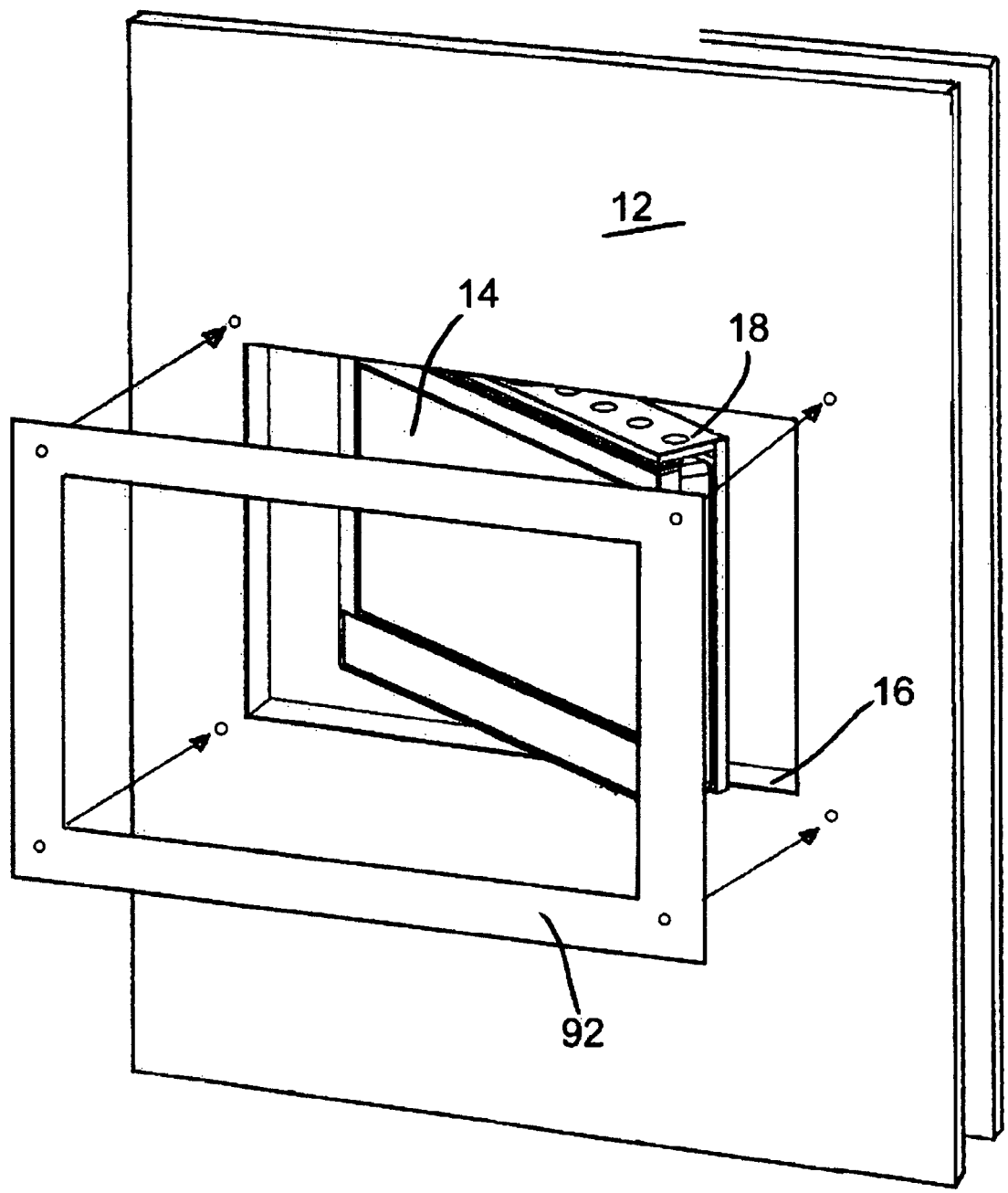
FIG. 23 is a perspective view of the mounted rotatable television unit similar to that shown in FIG. 1 but showing a finishing frame.

It will be appreciated by those skilled in the art that the unit of the present invention could also be used in a free standing wall unit 88 as shown in FIG. 21 or in a cabinet 90 as shown in FIG. 22. In regard to the cabinet embodiment it may be desirable to modify the inner frame 18' such that it does not include a top rototable bracket as shown in FIG. 22. Further there may be certain application where only one pivot is desirable and that being either a top pivot or a bottom pivot as shown in FIG. 22. In these cases dimensions and connections of the remainder of the unit would be modified to accommodate the different loads. Preferably the materials used to make the unit 10 herein are heat resistant such that the unit can tolerate the heat generated by the television.

The mounted rotatable television unit of the present invention may also include an outer finishing frame 92 that covers the outer frame. The outer finishing frame 92 may make the installation easier because the wall need not be finished right up to and over the outer frame.

The mounted rotatable television unit of the present invention is relatively easy to install. Installation requires the installer to simply cut an opening in the drywall and to block and studs frame opening before the unit can be put in place. A handy person could do this for nominal materials cost, or a skilled installer could do it at a reasonably nominal cost. The work is very basic to do for the average handy person but not within the capability of a non-handy person.

There are a number of features of the mounted rotatable television unit of the present invention that are advantageous. The unit 10 rotates at least 180 degrees and preferably 360 degrees in one direction and then back. This prevents wires from tangling. Preferably the inner frame 18 locks in place facing either direction. It will be appreciated by those skilled in the art that the unit 10 may be finished in a variety of different ways to complement the décor.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A mounted rotatable television unit for installing a television in one of a wall and a cabinet wherein when installed therein the television is rotatable at least 180 degree and wherein the television has a plurality of mounting holes in the back thereof, comprising:

an inner frame adapted to receive a television wherein the inner frame includes one of a top rotatable bracket and a bottom rotatable bracket and at least a pair of rear mounting brackets attached thereto and extending orthogonally therefrom, the rear mounting brackets having a plurality of mounting apertures formed therein adapted to be in registration with the mounting holes on the television and wherein the apertures are adapted to receive screws that secure the television to the inner frame;

an outer frame adapted to be installed in one of the wall and the cabinet and being rotatably attached to the inner frame whereby the inner frame may be pivoted such that the television is rotatable at least 180 degrees.

2. A mounted rotatable television unit as claimed in claim 1 wherein the inner frame further includes the other of the top rotatable bracket and the bottom rotatable bracket.

3. A mounted rotatable television unit as claimed in claim 2 further including a back cover attached to the inner frame.

4. A mounted rotatable television unit as claimed in claim 3 wherein the top rotatable bracket, the bottom rotatable bracket and the back cover include vent holes.

5. A mounted rotatable television unit as claimed in claim 4 wherein the inner frame further includes side brackets attached between the top rotatable bracket and the bottom rotatable bracket at either side thereof.

6. A mounted rotatable television unit as claimed in claim 5 further including at least one of a top and a bottom pivot.

7. A mounted rotatable television unit as claimed in claim 6 wherein there is a top and a bottom pivot.

8. A mounted rotatable television unit as claimed in claim 7 wherein each pivot includes a generally circular aperture formed in the outer frame and a generally tubular post attached to the inner frame and extending through the circular aperture in the outer frame and a sleeve between the circular aperture and the tubular post.

9. A mounted rotatable television unit as claimed in claim 8 wherein the sleeve is made from nylon.

10. A mounted rotatable television unit as claimed in claim 9 further including an outer frame collar attached around the circular aperture.

11. A mounted rotatable television unit as claimed in claim 6 wherein each pivot is a ball bearing type pivot.

12. A mounted rotatable television unit as claimed in claim 4 further including a lock to hold the inner frame in a predetermined position relative to the outer frame.

13. A mounted rotatable television unit as claimed in claim 4 further including a privacy strip mounted on one of the outer frame and the inner frame and extending between the outer frame and the inner frame.

14. A mounted rotatable television unit as claimed in claim 4 wherein the outer frame is mounted in a wall and the outer frame includes a bottom support and a top support and a bottom wall bracket mounted on the bottom support.

15. A mounted rotatable television unit as claimed in claim 14 further including a top wall bracket mounted on the top support.

16. A mounted rotatable television unit as claimed in claim 15 wherein the outer frame further includes side supports.

17. A mounted rotatable television unit as claimed in claim 16 wherein the wall is finished over the outer frame.

18. A mounted rotatable television unit as claimed in claim 1 further including a motor operably connected to the inner frame whereby activation of the motor pivots the inner frame.

19. A mounted rotatable television unit as claimed in claim 1 wherein the television is a flat screen television.

20. A mounted rotatable television unit as claimed in claim 1 wherein the inner frame includes a tubular post that extends into the television and further including a bottom pivot and wherein the pivot includes the post, a generally circular aperture and a sleeve, the aperture being formed in the outer frame and the post extends through the circular aperture in the outer frame and the sleeve is positioned between the circular aperture and the tubular post.

21. A mounted rotatable television unit as claimed in claim 1 wherein the inner frame is rotatable 180 degrees.

22. A mounted rotatable television unit as claimed in claim 1 wherein the inner frame is rotatable 360 degrees.

23. A mounted rotatable television unit as claimed in claim 1 wherein the inner frame is made from heat resistant materials.

24. A mounted rotatable television unit as claimed in claim 1 further including a remote control sensor operably connected to the unit.

25. A mounted rotatable television unit as claimed in claim 24 wherein the remote control sensor operates devices chosen from the group consisting of cable, satellite, VCR, DVD, computer and a combination thereof.

26. A mounted rotatable television unit as claimed in claim 25 wherein the remote control sensor operates a motor which is operably connected to the inner frame for turning the inner frame.

27. A mounted rotatable television unit as claimed in claim 1 further including an outer finishing frame.

* * * * *